United States Patent [19]
Tomeoku et al.

[11] Patent Number: 5,598,710
[45] Date of Patent: Feb. 4, 1997

[54] SUPERCONDUCTING APPARATUS AND METHOD FOR OPERATING SAID SUPERCONDUCTING APPARATUS

[75] Inventors: Hiroshi Tomeoku, Hitachi; Kiyoshi Yamaguchi, Mito; Ryukichi Takahashi, Hitachiota; Toshiharu Tominaka, Asaka; Naoki Maki, Ibaraki-ken, all of Japan

[73] Assignee: Hitachi, Ltd., Tokyo, Japan

[21] Appl. No.: 493,402

[22] Filed: Jun. 22, 1995

[30] Foreign Application Priority Data

Jul. 4, 1994 [JP] Japan .................................. 6-152050

[51] Int. Cl.⁶ .......................... F25B 19/00; F17C 7/04
[52] U.S. Cl. ............................................ 62/51.1; 62/48.1
[58] Field of Search ................................ 62/51.1, 48.1, 62/50.7

[56] References Cited

U.S. PATENT DOCUMENTS

| | | |
|---|---|---|
| 3,711,744 | 1/1978 | Luton, Jr. . |
| 3,965,689 | 6/1976 | Brown et al. .......................... 62/48.1 |
| 5,117,640 | 6/1992 | Ginfrida, Jr. .......................... 62/48.1 |
| 5,267,445 | 12/1993 | Schittenhelm et al. ................ 62/48.1 |
| 5,291,739 | 3/1994 | Woods et al. ......................... 62/48.1 |
| 5,419,142 | 5/1995 | Good ................................... 62/51.1 |

FOREIGN PATENT DOCUMENTS 2247355  2/1992  European Pat. Off. .

OTHER PUBLICATIONS

Patent Abstracts Of Japan, vol. 14, No. 493 (E–0995), Oct. 26, 1990 & JP-A-02 203573 (Sumitomo Heavy Ind. Ltd.), Aug. 13, 1990.
Research Disclosure, No. 330, Oct. 1991, Havant GB, pp. 829–831, 'cryogenic system for fault current limiter'.
Patent Abstracts Of Japan, vol. 12, No. 115 (E–599), Apr. 12, 1988 & JP-A-62 244110 (Toshiba Corp), Oct. 24, 1987.

Primary Examiner—Christopher Kilner
Attorney, Agent, or Firm—Kenyon & Kenyon

[57] ABSTRACT

A superconducting apparatus is provided with a cryostat, a superconducting magnet contained in the cryostat, an emergency gas discharge pipe connected with the cryostat, and an emergency discharge valve disposed midway of the discharge pipe for discharging to an external environment an emergency discharge gas generated at quenching. In addition, the superconducting apparatus is provided with a gas heating unit for heating the emergency discharge gas flowing inside the discharge pipe.

22 Claims, 8 Drawing Sheets

SUPERCONDUCTING APPARATUS AND METHOD FOR OPERATING SAID SUPERCONDUCTING APPARATUS

BACKGROUND OF THE INVENTION

The present invention relates to a superconducting apparatus and a method of operation, or more in particular to a superconducting apparatus comprising an emergency gas discharge pipe for discharging the gas generated in a cryostat at the time of quenching as an emergency measure.

In the case where a superconducting apparatus such as a superconducting magnet apparatus is operated, the superconducting magnet itself may be burnt by the electromagnetic energy stored in the superconducting magnet at the time of transition to normal conductive state, i.e., during quenching.

Generally, in order to avoid this burning, energy consumption means, i.e., a protective resistor (or a protective diode) is connected in parallel to the superconducting magnet, so that the energy stored in the superconducting magnet is consumed as heat in the resistor, and at the same time the gas generated in the cryostat is discharged out of the cryostat as an emergency measure through an emergency gas discharge pipe mounted on the cryostat.

FIG. 11 shows the general configuration of a superconducting magnet apparatus in common use. This superconducting magnet apparatus has therein a cryostat 1 which hermetically contains a very low temperature refrigerant, i.e., liquid helium 7 and also a superconducting magnet 2 installed therein.

The superconducting magnet 2 is connected to a power supply 4 through a power lead 3. A breaker 5 and a protective resistor 6 are interposed between the power supply 4 and the superconducting magnet 2. The superconducting magnet 2 in the cryostat 1 is cooled by the refrigerant liquid helium 7 to assure satisfactory heat exchange thereof.

A radiation shield plate 10 is mounted in the space between the surface of the liquid helium in the cryostat and the flange 9 above the cryostat in order to prevent penetration of heat by radiation and convection from the upper flange 9 side. Also, the upper flange 9 has mounted thereon a recovery port 11 for recovering the evaporated helium gas under steady-state operation and an emergency gas discharge pipe for releasing a great amount of evaporated helium gas at the time of quenching the superconducting magnet 2.

The component part designated by reference numeral 13 mounted midway of the emergency gas discharge pipe 12 is an emergency valve (safety valve) constructed in such a manner as to open in case of emergency (at the time of quenching). Although the drawing under consideration shows that a vent 14 of the emergency gas discharge pipe is adapted to open in the vicinity of the cryostat, the vent 14 is normally mounted in such a manner as to discharge the gas outdoor ten and several meters to several tens of meters away.

In a superconducting magnet apparatus constructed in the above-mentioned way, assume the operation of a magnet apparatus having a central generated magnetic field of 6 T, an outer dimension of 1.5 m and a height of about 1 m. The crystat has an inner diameter of about 2 m and a height of about 4 m, and has liquid helium of about 5 cubic meters stored therein.

Helium of course evaporates under steady-state operating conditions. The amount of helium evaporated under steady-state operating conditions, however, is not very great and, for the superconducting magnet apparatus of the above-mentioned capacity, is considered about 100 liter per hour in terms of liquid helium. The amount of evaporation is about 80 kiloliters per hour in terms of gas. This much quantity can be recovered sufficiently by the emergency gas discharge pipe 12 of about 10 cm in diameter.

SUMMARY OF THE INVENTION

A purpose of the present invention is to provide a superconducting apparatus which can prevents an emergency discharge pipe from being vibrated and deformed by introducing a simple device into the superconducting apparatus, even if a great amount of cold helium gas is generated by quenching.

Another purpose of the present invention is to provide a method for operating the superconduting device aforementioned.

With a superconducting magnet apparatus constructed in the manner described above, even in case of an emergency, i.e., at the time of quenching, the greater portion of the energy stored in the magnet is consumed as heat by a resistor, and the great amount of helium gas evaporated by the remaining energy is discharged outside through an emergency valve and an emergency gas discharge pipe. This eliminates the problem of burning of the superconducting magnet. Once the superconducting magnet is quenched, however, depending on the degree of energy recovery by the protective resistor, liquid helium of 2 to 3 cubic meters is evaporated at once and a great amount of cold helium gas passes through the emergency valve and the emergency gas discharge pipe during the short period of several seconds to several minutes. The emergency valve and the emergency gas discharge pipe are thus thermally contracted abruptly. As a result, the emergency valve and the emergency gas discharge pipe may be deformed, or may be vibrated or issue a large noise due to the deformation.

Further, water content of the air forms dew on the outer peripheral portions of the cold emergency gas discharge pipe, often resulting in water dripping from the emergency discharge piping system. This may damage the equipment installed under the piping system. Considerable time and labor are liable to be consumed by the preventive measures taken against these inconveniences.

The prevent invention has been developed in view of the aforementioned facts, and the object thereof is to provide a superconducting apparatus of this kind and a method of operation thereof in which even in the case where a great amount of cold helium gas is generated at the time of quenching, deformation or vibrations of the emergency discharge pipe is prevented without using any specially rugged construction of the emergency discharge pipe or a special bulky apparatus or without requiring any special energy.

In other words, according to the present invention, a gas heating unit for heating the emergency discharge gas is provided in or on the emergency gas discharge pipe thereby to attain the predetermined object. Also, a resistor is used for consuming the energy stored in a superconducting magnet at the time of quenching. In this way, the predetermined object is achieved without increasing the size of the superconducting apparatus or without requiring any special energy source.

More specifically, with a superconducting magnet apparatus constructed as described above, even when a great amount of cold discharge gas is generated at the time of quenching, the gas is heated so that the thermal contraction of the emergency valve or the emergency gas discharge pipe due to the discharge gas is not very abrupt. In other words, the thermal deformation of the emergency valve and the emergency gas discharge pipe is small, resulting in reduced vibrations due to deformation.

Also, the above-mentioned effect can be achieved by arranging a protective resistor as a heating unit within the discharge pipe without increasing the size of the superconducting apparatus or without requiring any special energy source.

As described above, according to the present invention, a gas heating unit for heating the emergency discharge gas is provided in or on an emergency gas discharge pipe. Even when a great amount of cold discharge gas is generated at the time of quenching, therefore, the gas is warmed in such a manner that rapid thermal contraction, i.e., thermal deformation of the emergency valve or the emergency gas discharge pipe is so small that it is not necessary to use a specially-constructed rugged emergency discharge pipe or a special bulky apparatus. Also, a superconducting apparatus of this class free of special energy requirement without deformation or vibrations of the emergency discharge pipe can be obtained.

DESCRIPTION OF THE REFERRED EMBODIMENTS

Figure 1:
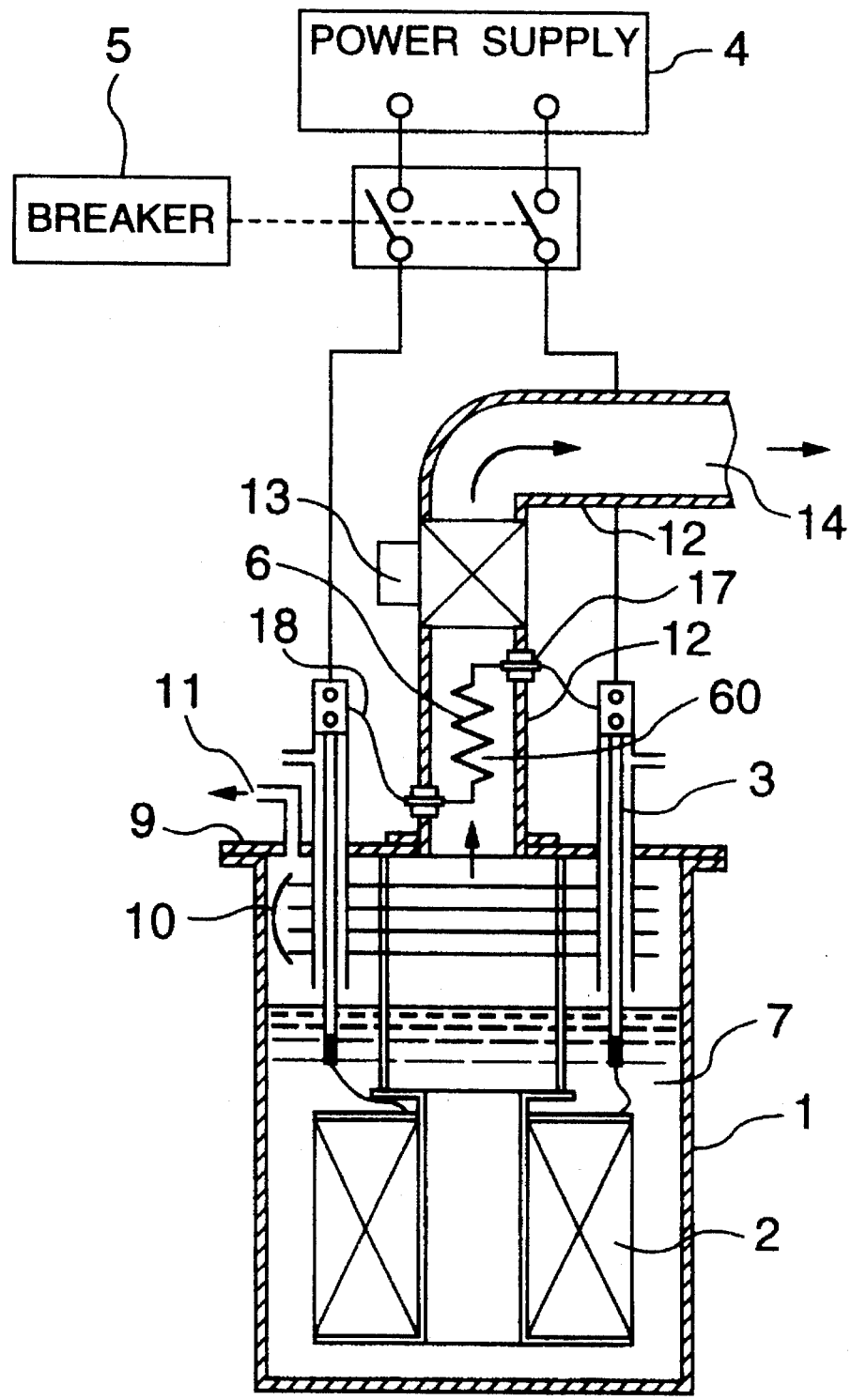
FIG. 1 is a longitudinal sectional view of a superconducting apparatus according to an embodiment of the invention.
Figure 11:
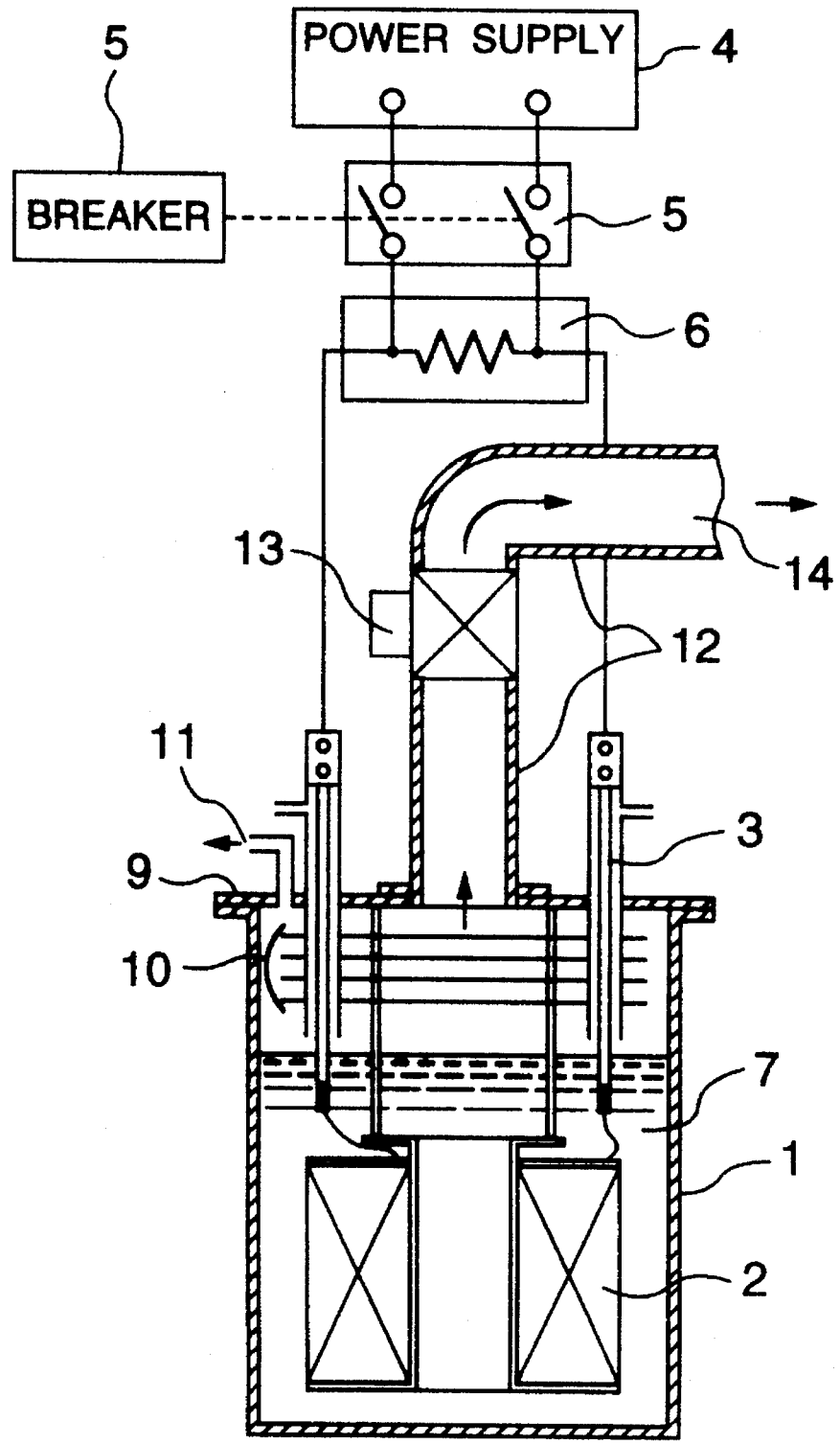
FIG. 11 is a longitudinal sectional view of a conventional superconducting apparatus.

The present invention will be explained in detail below with reference to the embodiments shown. FIG. 1 is a sectional view showing the general configuration of a superconducting magnet apparatus based on the present invention. The component parts or devices identical to those in the prior art in FIG. 11 are designated with the same reference numerals respectively in FIG. 1 and will not be described in detail. The difference of this embodiment from the conventional apparatuses is that a heating unit 60 or the like heater is arranged at a point lower than an emergency valve 13, that is, in the vicinity of a cryostat in an emergency gas discharge pipe 12.

In this case, a heat source activated by electric power such as a protective resistor 6 is used as the heating unit 60. Such a unit is disposed in contact with an emergency discharge gas flow. Also, this protective resistor 6 is connected to a power lead 4 through a current terminal 17 electrically insulated from the emergency gas discharge pipe 12. A lead wire 18 is also provided.

In this configuration, under normal operating conditions, a breaker 5 is closed and the superconducting magnet 2 is excited by the power supply 4. When the quenching occurs for some reason or others, the fact is detected and the breaker 5 is opened. The current that has thus far been flowing in the superconducting magnet commutates to and heats the protective resistor 6. The superconducting magnet 2 itself also begins to generate heat through an internal resistor r which is generated by the quenching. This heat causes the refrigerant liquid helium 7 to evaporate rapidly thereby to increase the internal pressure of the cryostat 1.

In the process, when the internal pressure of the cryostat exceeds a certain pressure value setting, the emergency valve 13 opens and the evaporated refrigerant gas is discharged outdoor from a vent 14 through the emergency gas discharge pipe 12.

The evaporated refrigerant gas deprives the protective resistor 6 of heat, so that the helium gas that has so far been cold is warmed substantially up to about the room temperature and is discharged outdoor from the vent 14 through the emergency gas discharge pipe 12. Upon occurrence of quenching in this manner, the evaporated refrigerant gas is heated by the protective resistor 6. As a result, the emergency gas discharge pipe 12 is prevented from deformation which otherwise might be caused by rapid cooling. The emergency gas discharge pipe or the support members thereof thus need not be constructed in specially rugged form. Also, the work for laying the emergency gas discharge pipe is facilitated, while at the same time making it possible to avoid the adverse effects described above.

Figure 2:
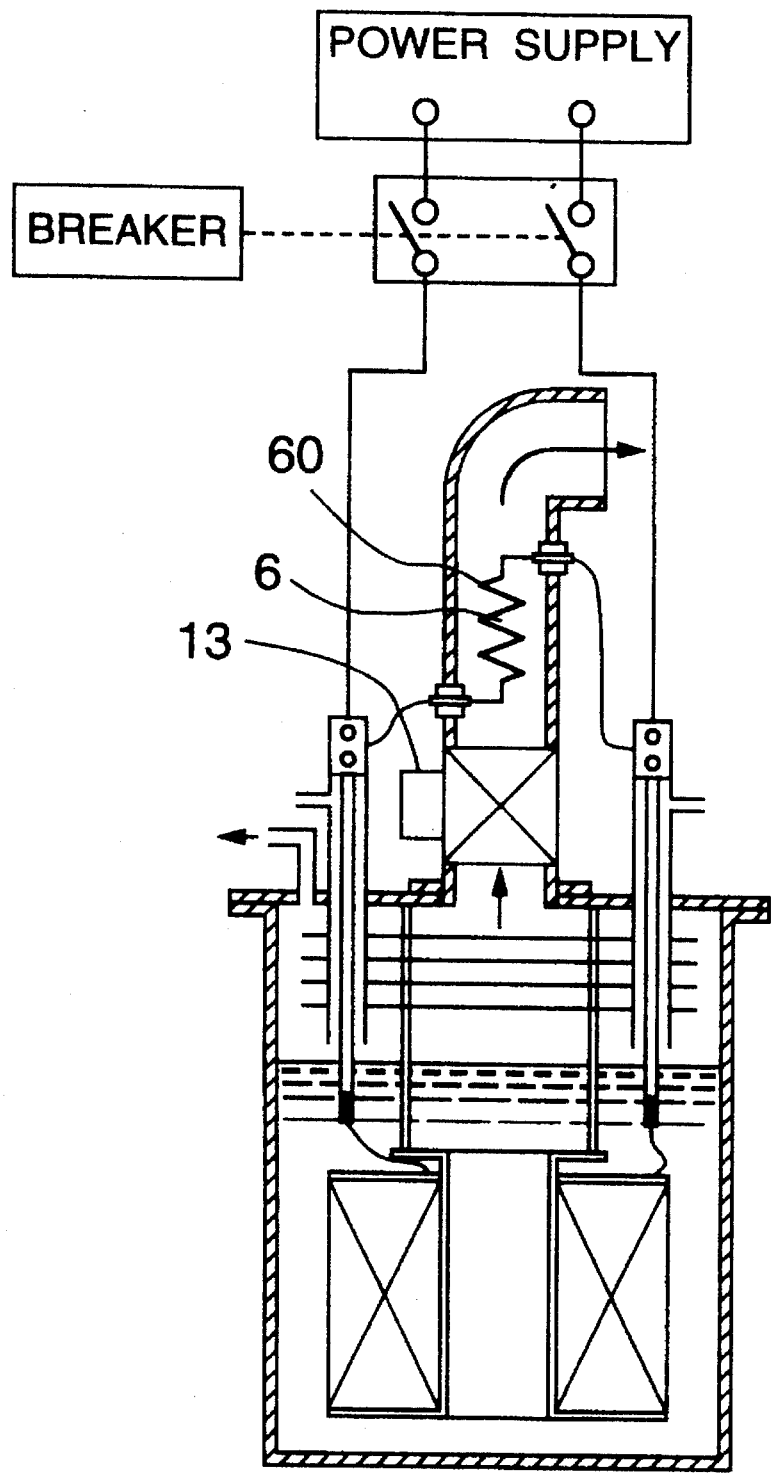
FIG. 2 is a longitudinal sectional view of a superconducting apparatus according to another embodiment of the invention.

In the foregoing explanation, a heating unit is arranged in the discharge pipe on the cryostat side of the emergency valve 13 (which arrangement of course is more advantageous from the viewpoint of preventing thermal contraction of the emergency valve 13). In spite of this explanation, the heating unit is not necessarily constructed in this way. Instead, of course, the emergency valve 13 itself may be constructed to act as a heating unit or, as shown in FIG. 2, may be installed upward on the atmosphere side of the emergency valve 13 in the emergency gas discharge pipe 12.

Further, in the case where a protective resistor or a protective diode is used as a heating unit, the heating of the protective resistor or the protective diode, as the case may be, occurs simultaneously with the evaporation of the liquid helium at the time of quenching the superconducting magnet. The energy recovery rate from the superconducting magnet by the protective resistor or the protective diode at the time of quenching (the ratio expressed in percent between the energy recovered by the protective resistor from the superconducting magnet and the residual energy) is at best 90% or normally 50 to 60% depending on the size of the superconducting magnet apparatus involved.

This is indicative of the fact that the energy that remains in the superconducting magnet without being recovered and is consumed for evaporation of liquid helium at the time of quenching is substantially the same as the energy recovered by the protective resistor for increasing the temperature of the evaporated cold helium gas to about the room temperature. Since these two events occur at substantially the same time, the thermal energy of the protective resistor can be used sufficiently for increasing the temperature of the evaporated helium gas.

Figure 3:
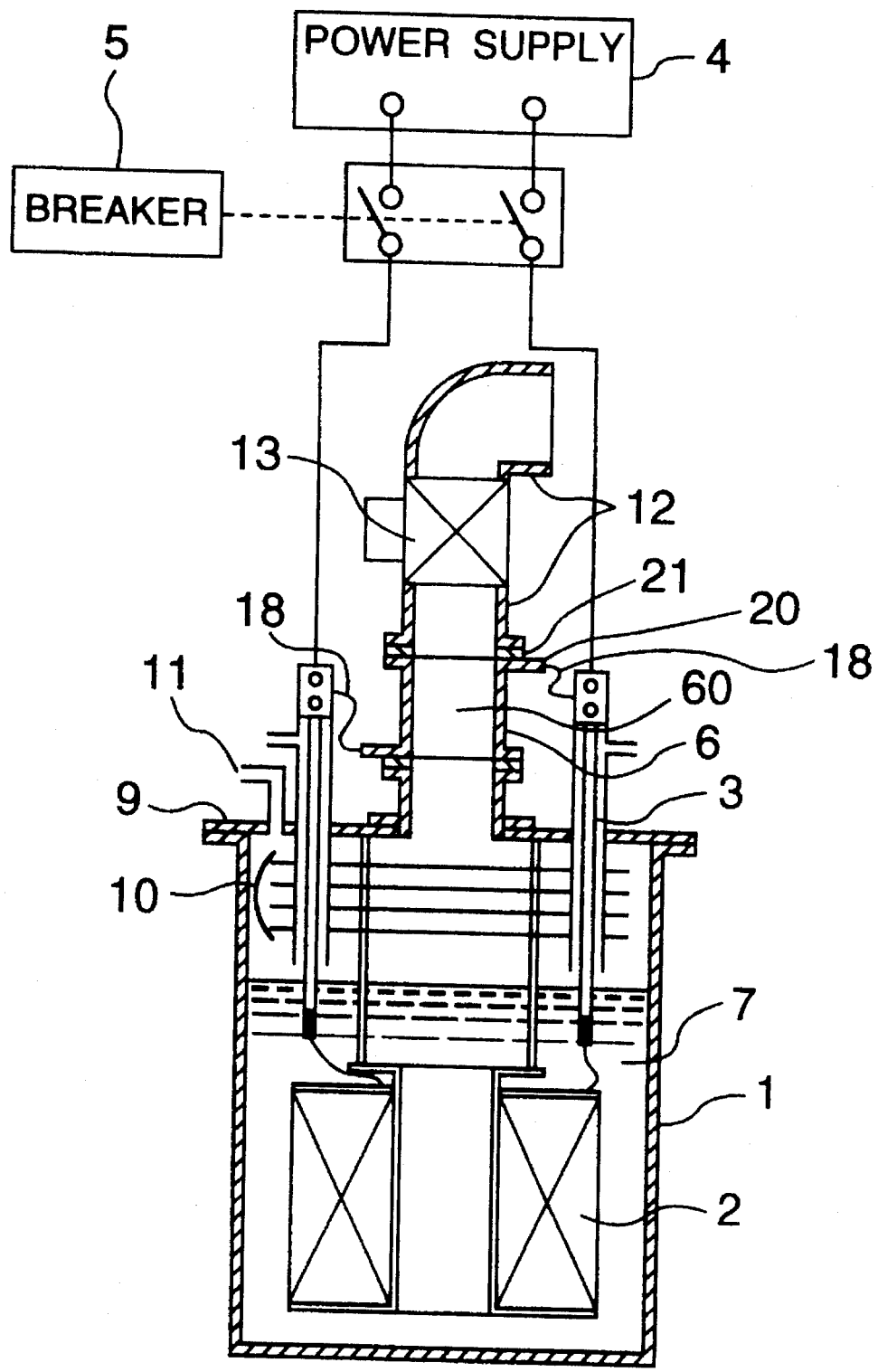
FIG. 3 is a longitudinal sectional view of a superconducting apparatus according to still another embodiment of the invention.

Another embodiment of the superconducting magnet apparatus according to the present invention is shown in FIG. 3. The component parts of this embodiment designated by 1 to 14 are identical to the corresponding parts in the above-mentioned embodiment respectively and will not be described. A protective resistor 6 connected in parallel to a coil is used as a heating unit. In this case, however, this heating unit is such that a longitudinal portion of the emergency gas discharge pipe 12 made of metal is electrically insulated by means of an electrical insulating member 21 to form a tubular heating unit.

The tubular heating unit 60 has electrodes 20 mounted thereon and is connected with power leads 3. In this case, the resistance value of the protective resistor and the inner diameter required of the emergency gas discharge pipe are optimally determined according to the type of the metal employed by adjusting the thickness and length of the discharge pipe.

The operating principle and the effects of this embodiment are similar to those of the aforementioned embodiment. With the configuration under consideration, however, no special equipment is required in the emergency gas passage, thereby leading to the advantages of fewer component parts being required and a smaller gas flow resistance.

Figure 4:
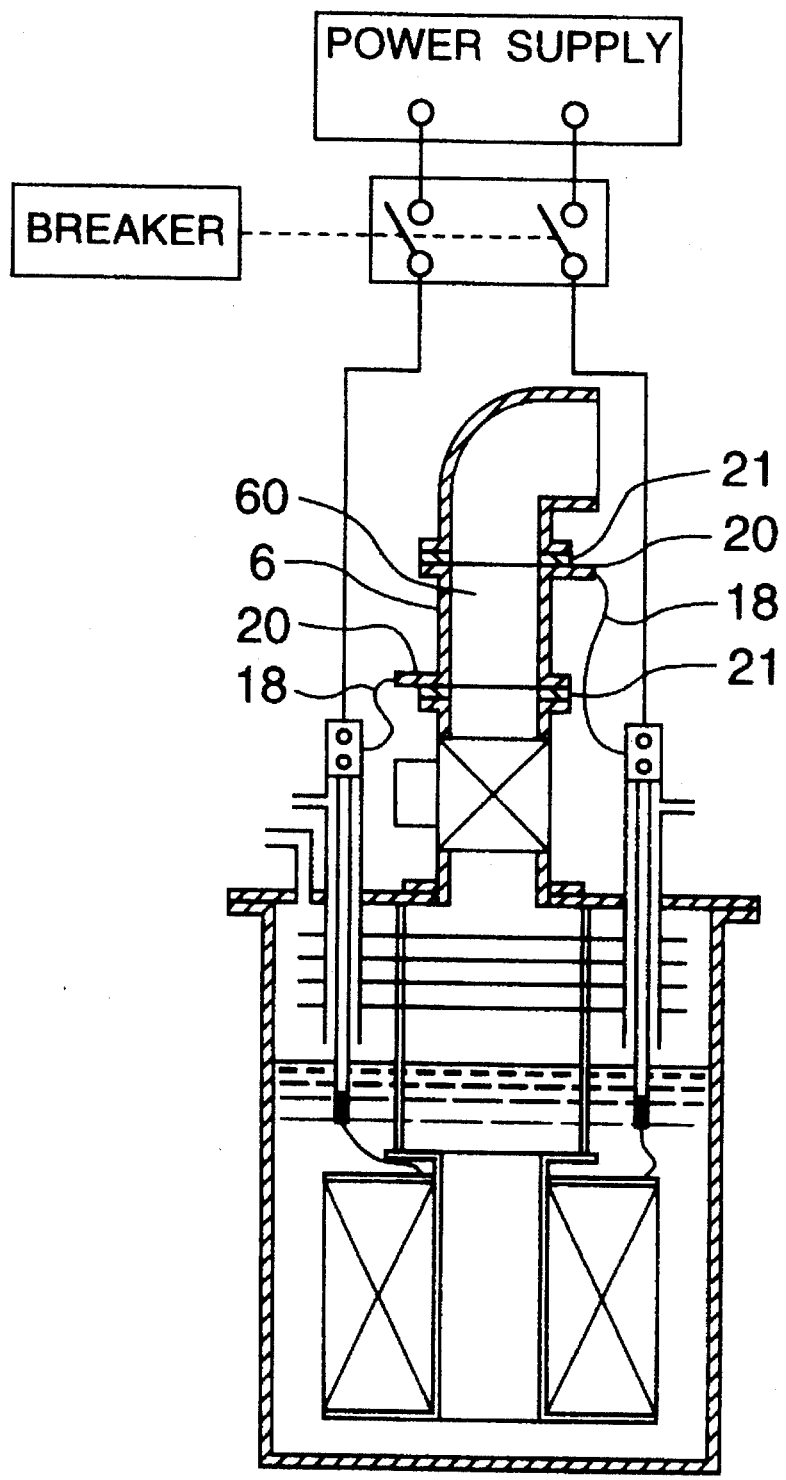
FIG. 4 is a longitudinal sectional view of a superconducting apparatus according to a further embodiment of the invention.

In this case, too, as shown in FIG. 4, the tubular heating unit 60 may be disposed on the atmosphere side of the emergency gas discharge pipe 12 above the emergency valve 13. Also, in spite of the foregoing explanation that a longitudinal portion of the emergency gas discharge pipe 12 is formed into a heating unit, the whole of the emergency gas discharge pipe 12 may alternatively be so formed with equal effect. Further, the emergency gas discharge pipe 12 may be constructed of ceramics or other electrical insulating material.

Figure 5:
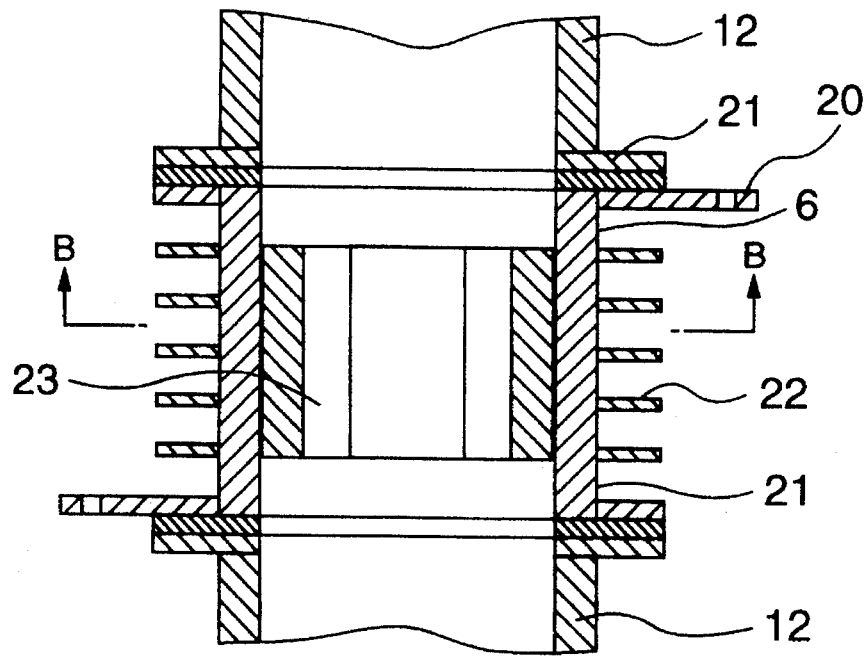
FIG. 5 is a longitudinal sectional view of a heating unit used with a superconducting apparatus according to an embodiment of the invention.
Figure 6:
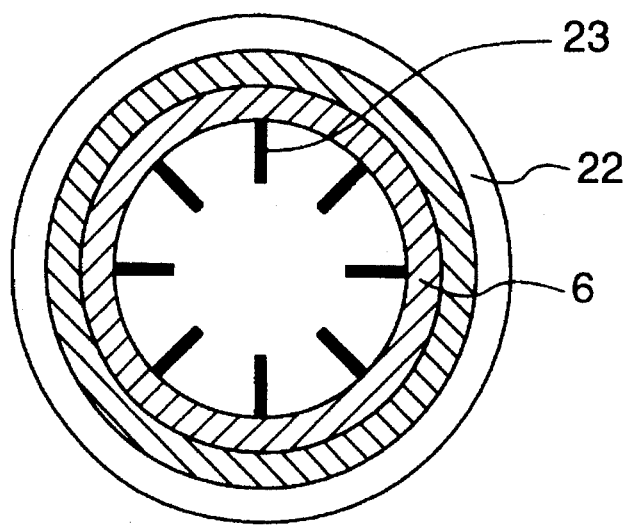
FIG. 6 is a sectional view taken on line B—B in FIG. 5.

FIGS. 5 and 6 are diagrams showing a partially enlarged view of a tubular protective resistor 6 according to the above-mentioned embodiment. In the embodiment, a plurality of inner fins 23 are provided on the inner surface of the tubular protective resistor 6 and a plurality of outer fins 22 on the outer surface of the tubular protective resistor 6.

The outer fins 22 contribute to an improved energy recovery rate by the protective resistor and prevent the tubular protective resistor 6 from being overheated when the evaporated helium gas is small in amount. These fins accelerate heat radiation into the surrounding space. The inner fins 23 are provided in order to improve the heat exchange between the tubular protective resistor 6 and the evaporated helium gas. Either the outer fins 22 or the inner fins 23 or both are provided as required.

Figure 7:
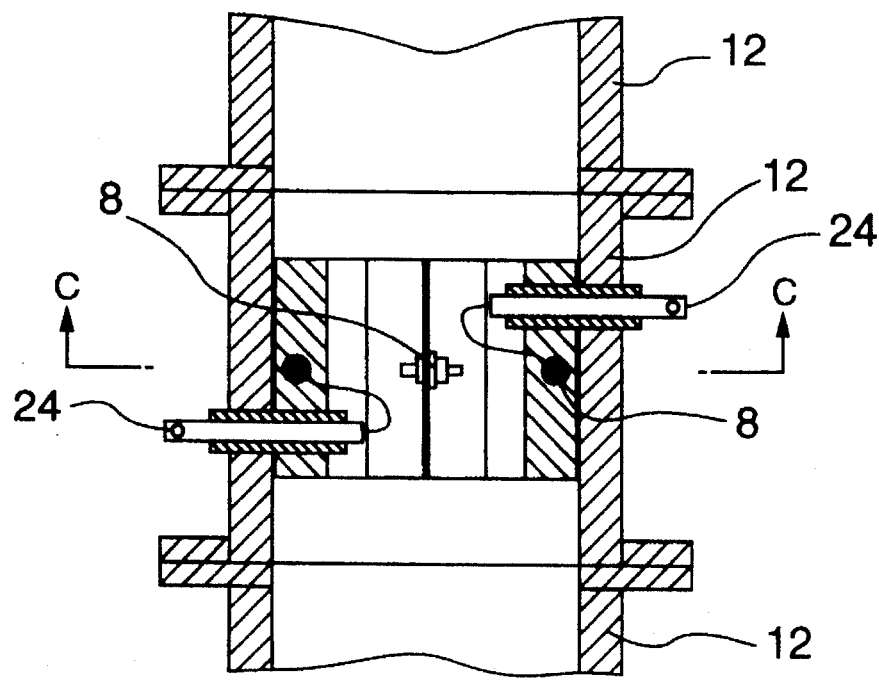
FIG. 7 is a longitudinal sectional view of a heating unit used with a superconducting apparatus according to another embodiment of the invention.
Figure 8:
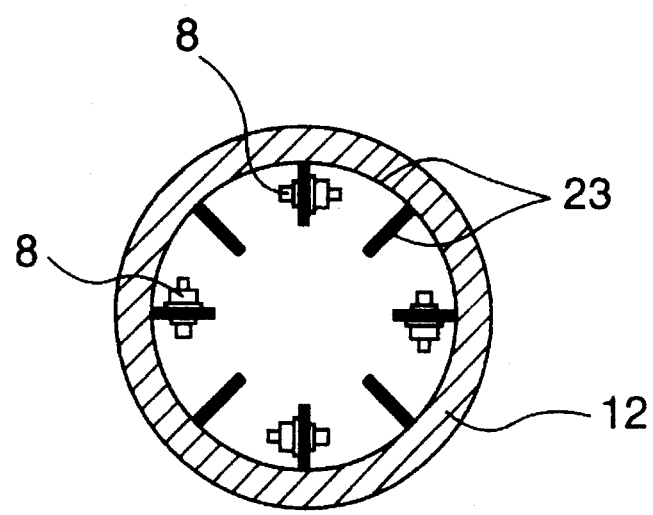
FIG. 8 is a sectional view taken on line C—C in FIG. 7.

FIGS. 7 and 8 show an embodiment in which a protective diode 8 is mounted on each of the inner fins 23 of the emergency gas discharge pipe 12. A protective diode 8 is mounted on each inner fin 23 installed in the emergency gas discharge pipe 12. Electrical connection with the protective diode 8 is established through an electrode 24 electrically insulated from the emergency gas discharge pipe 12.

Figure 9:
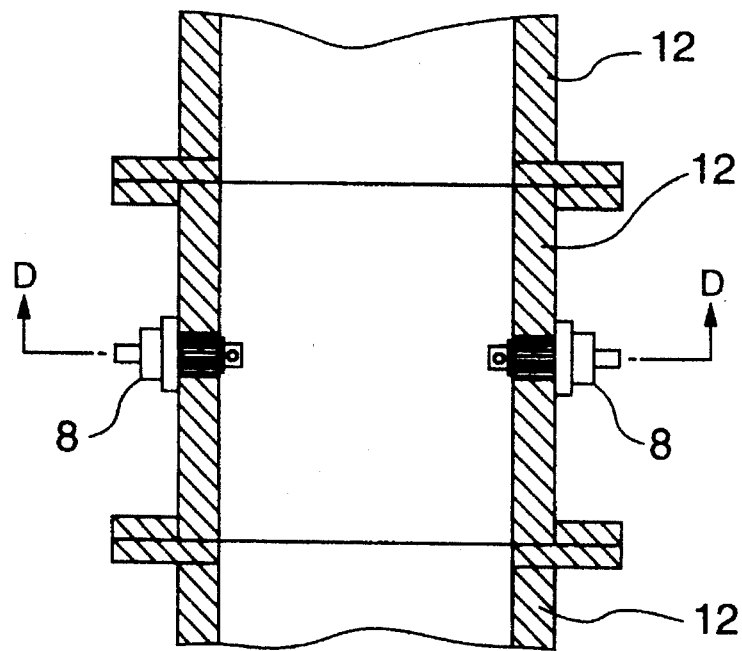
FIG. 9 is a longitudinal sectional view of a heating unit used with a superconducting apparatus according to another embodiment of the invention.
Figure 10:
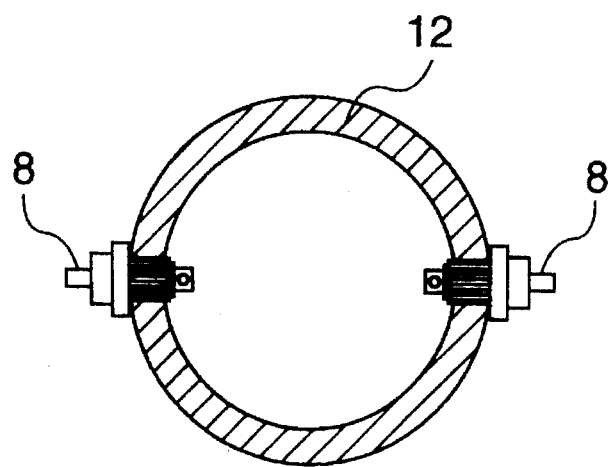
FIG. 10 is a sectional view taken on line D—D in FIG. 9.

FIGS. 9 and 10 are diagrams showing an embodiment in which a protective diode 8 is mounted directly on an emergency gas discharge pipe 12, so that the heat generated from the protective diode 8 is transmitted directly to the wall of the emergency gas discharge pipe 12. This embodiment is simpler in construction than the embodiment of FIG. 7 with a lower resistance in the emergency gas flow and a reduced installation cost.

With a superconducting magnet apparatus constructed as described above, a protective resistor or a protective diode heats the cold evaporated gas of the refrigerant generated at the time of quenching, thereby reducing the costs which otherwise might be required for the various works for preventing the adverse effects of the deformation or noises accompanied by the thermal contraction of the piping system due to the rapid flow of the cold evaporated gas or the water drips caused by the dew formed on the piping system. Further, the restraints the required work has thus far imposed on the location are removed.

Further, the use of the emergency gas discharge pipe electrically insulated as a protective resistor not only has the above-mentioned advantages but also eliminates the need of a protective resistor which otherwise might be required to be produced as a separate part. In addition, in a superconducting magnet apparatus required to be reduced in weight, the effects of the embodiment contribute to a reduced size and weight which constitutes one of the important themes of such an apparatus.

Furthermore, in view o the fact that the emergency gas discharge pipe which was a wasteful space in other than a case of emergency provides a location for installation of a protective resistor or a protective diode, the whole apparatus is reduced in size. Further, the possibility of a protective resistor or the like being mountable in the vicinity of the power lead above the cryostat saves the length of the electrical wiring. The smaller proportion of inductance components of the electrical wiring is a fact very favorable to a protective resistor or a protective diode in which current attenuation is accelerated in case of emergency.

What is claimed is:

1. A superconducting apparatus comprising a superconducting magnet contained in a cryostat and operated in a very low temperature refrigerant, an emergency gas discharge pipe connected with the cryostat for discharging to the external environment the gas generated in the cryostat at the time of quenching, and an emergency valve provided midway of the emergency gas discharge pipe and adapted to open at the time of quenching;

wherein a gas heating unit for heating the emergency discharge gas is arranged inside the emergency gas discharge pipe.

2. A superconducting apparatus comprising a superconducting magnet contained in a cryostat and operated in a very low temperature refrigerant, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein a gas heating unit for heating the discharge gas at the time of discharge of the emergency discharge gas is arranged in the vicinity of the cryostat inside the emergency gas discharge pipe.

3. A superconducting apparatus comprising a superconducting magnet contained in a cryostat and operated in a very low temperature refrigerant, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein a heating unit for heating the emergency gas discharge pipe is provided inside and/or outside the emergency gas discharge pipe.

4. A superconducting apparatus comprising a superconducting magnet contained in a cryostat and operated in a very low temperature refrigerant, energy consumption means coupled to the coil of the superconducting magnet for consuming the energy stored in the superconducting magnet at the time of quenching, an emergency gas discharge pipe connected with the cryostat or discharging to the external environment the gas generated in the cryostat at the time of quenching, and an emergency valve provided midway of the emergency gas discharge pipe and adapted to open at the time of quenching;

wherein a tubular heating unit having substantially the same diameter as the emergency gas discharge pipe arranged midway along the longitudinal direction of the emergency gas discharge pipe for heating the emergency discharge gas.

5. A superconducting apparatus comprising a superconducting magnet contained in a cryostat and operated in a very low temperature refrigerant, energy consumption means connected to the superconducting magnet for consuming the energy stored in the superconducting magnet at the time of quenching, an emergency gas discharge pipe for discharging to the external environment the gas generated in the cryostat at the time of quenching, and an emergency valve provided midway of the emergency gas discharge pipe and adapted to open at the time of quenching;

wherein the energy consumption means is provided in the emergency gas discharge pipe.

6. A superconducting apparatus comprising a superconducting magnet contained in a cryostat and operated in a very low temperature refrigerant, energy consumption means connected to the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein the energy consumption means is arranged in contact with the discharge gas flow at the time of quenching in the vicinity of the cryostat in the emergency gas discharge pipe.

7. A superconducting apparatus comprising a superconducting magnet contained in a cryostat and operated in a very low temperature refrigerant, energy consumption means connected to the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein the energy consumption means mounted on the superconducting magnet is interposed between the cryostat and the emergency valve in the emergency gas discharge pipe.

8. A superconducting apparatus comprising a superconducting magnet contained in a cryostat and operated in a very low temperature environment, a protective resistor connected to the superconducting magnet for consuming the energy stored in the superconducting magnet at the time of quenching, an emergency gas discharge pipe connected with the cryostat for discharging to the external environment the gas generated in the cryostat at the time of quenching, and an emergency valve provided midway of the emergency gas discharge pipe and adapted to open at the time of quenching;

wherein the protective resistor connected to the superconducting magnet is constructed in a cylindrical or tubular shape of substantially the same diameter as the emergency gas discharge pipe, and the tubular protective resistor is arranged midway of the emergency gas discharge pipe.

9. A superconducting apparatus comprising a superconducting magnet contained in a cryostat and operated in a very low temperature refrigerant, a protective resistor coupled to the coil of the superconducting magnet for consuming the energy stored in the superconducting magnet at the time of quenching, an emergency gas discharge pipe connected with the cryostat for discharging to the external environment the gas generated in the cryostat at the time of quenching, and an emergency valve provided midway of the emergency gas discharge pipe and adapted to open at the time of quenching;

wherein a longitudinal part of the emergency gas discharge pipe is electrically insulated from the other parts of the pipe, and the insulated pipe part is used as a protective resistor of the superconducting magnet.

10. A superconducting apparatus according to claim 8, wherein the protective resistor is formed of ceramics.

11. A superconducting apparatus according to claim 8, wherein the protective resistor is installed on the atmospheric pressure side of the emergency valve.

12. A superconducting apparatus comprising a superconducting magnet contained in a cryostat and operated in a very low temperature refrigerant, a protective resistor connected to the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein the whole of the emergency gas discharge pipe is insulated electrically and is used as the protective resistor.

13. A superconducting apparatus comprising a superconducting magnet contained in a cryostat and operated in a very low temperature refrigerant, selected one of a protective resistor and a protective diode connected to the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein selected one of the protective resistor and the protective diode is arranged in the emergency gas discharge pipe and is constructed in such a manner that the heat generated from selected one of the protective resistor and the protective diode is transmitted to the wall of the emergency gas discharge pipe.

14. A superconducting apparatus according to claim 13, wherein selected one of the protective resistor and the diode is arranged on the atmospheric pressure side of the emergency valve.

15. A superconducting apparatus comprising a superconducting magnet contained in a cryostat and operated in a very low temperature refrigerant, selected one of a protective resistor and a protective diode coupled to the coil of the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein selected one of the protective resistor and the protective diode is arranged in the emergency gas discharge pipe and is installed directly in such a manner that the heat generated from selected one of the protective resistor and the protective diode is transmitted to the emergency gas discharge pipe.

16. A superconducting apparatus comprising a superconducting magnet contained in a cryostat and operated in a very low temperature refrigerant, selected one of a protective resistor and a protective diode coupled to the coil of the superconducting magnet for consuming the energy stored in the superconducting magnet at the time of quenching, an emergency gas discharge pipe connected with the cryostat for discharging to the external environment the gas generated in the cryostat at the time of quenching, and an emergency valve arranged midway of the emergency gas discharge pipe and adapted to open at the time of quenching;

wherein a plurality of heat-exchange fins are provided in the emergency gas discharge pipe, and selected one of the protective resistor and the protective diode is mounted on each of the fins in such a manner as to permit heat transfer.

17. A superconducting apparatus according to claim 15, wherein the emergency gas discharge pipe is made of an electrically insulating material.

18. A method of operating a superconducting apparatus comprising a superconducting magnet contained in a cryostat and operated in a very low temperature refrigerant, an emergency gas discharge pipe connected with the cryostat for discharging to the external environment the gas generated in the cryostat at the time of quenching, an emergency valve provided midway of the emergency gas discharge pipe, and means for opening the emergency valve and discharging to the external environment the gas generated in the cryostat through the discharge pipe;

wherein a gas heating unit for heating the gas flowing in the emergency gas discharge pipe is arranged on the atmospheric air side of the emergency valve in the emergency gas discharge pipe, the gas heating unit being activated during the operation of the superconducting apparatus.

19. A method of operating a superconducting apparatus comprising a superconducting magnet contained in a cryostat and operated in a very low temperature refrigerant, an emergency gas discharge pipe connected with the cryostat for discharging to the external environment the gas generated in the cryostat at the time of quenching, an emergency valve provided midway of the emergency gas discharge pipe, and means for opening the emergency valve and discharging the gas generated in the cryostat to the external environment through the discharge pipe at the time of quenching;

wherein a gas heating unit for heating the gas flowing in the emergency gas discharge pipe is arranged in the emergency gas discharge pipe and is operated at the same time as the opening of the emergency valve to discharge the discharge gas in heated condition.

20. A superconducting apparatus according to claim 9, wherein the protective resistor is formed of ceramics.

21. A superconducting apparatus according to claim 9, wherein the protective resistor is installed on the atmospheric pressure side of the emergency valve.

22. A superconducting apparatus according to claim 16, wherein the emergency gas discharge pipe is made of an electrically insulating material.

* * * * *